United States Patent
Deeg et al.

[11] Patent Number: 5,890,965
[45] Date of Patent: Apr. 6, 1999

[54] DRY COUPLING

[75] Inventors: Thomas Deeg, Seuzach, Switzerland; Peter Pfeifer; Gunther Lutz, both of Salzburg, Austria

[73] Assignees: Maag Getriebe AB, Zurich, Switzerland; Dr. Ing. Geislinger &C., Schwingungstechnik Gesellschaft mbH, Saltzburg, Austria

[21] Appl. No.: 676,127
[22] PCT Filed: Nov. 13, 1995
[86] PCT No.: PCT/CH95/00266
§ 371 Date: Sep. 13, 1996
§ 102(e) Date: Sep. 13, 1996
[87] PCT Pub. No.: WO96/15385
PCT Pub. Date: May 23, 1996

[30] Foreign Application Priority Data

Nov. 14, 1994 [CH] Switzerland .................. 3400/94

[51] Int. Cl.[6] ........................................ F16D 3/72
[52] U.S. Cl. ...................... 464/88; 464/99; 464/147; 464/181
[58] Field of Search .................. 464/51, 88, 92, 464/99, 147, 155, 902, 903

[56] References Cited

U.S. PATENT DOCUMENTS

| 4,188,800 | 2/1980 | Fujita et al. .......................... 464/179 |
| 4,335,587 | 6/1982 | Thomamueller et al. ......... 464/181 X |
| 4,411,634 | 10/1983 | Hammelmann ................. 464/88 X |
| 4,708,692 | 11/1987 | Weiss .................................... 464/147 X |
| 4,747,806 | 5/1988 | Krude et al. ......................... 464/182 |
| 4,802,882 | 2/1989 | Heidrich ................................ 464/99 |

FOREIGN PATENT DOCUMENTS 614159 12/1960 Italy ..................................... 464/182

*Primary Examiner*—Eileen A. Dunn
*Attorney, Agent, or Firm*—Laurence R. Brown

[57] ABSTRACT

The dry coupling includes a typical shaft to shaft coupling, conformed to embody the invention by inclusion of two hub parts (4) with hub flanges (5,5') bonded thereunto and also an intermediate tube (6) interconnecting the flanges with respective flanges (7), each forming a membrane. For transmitting a torque the flanges are coupled to adjacent hub flanges (5). It is important that all parts (4,5;6,7) possibly except connecting elements (8) consist of a high modulus fiber reinforced material (FVW). Preferably the hubs consist of a carbon fiber reinforced material (CFK) and the intermediate tube of a more flexible GFK.

7 Claims, 1 Drawing Sheet

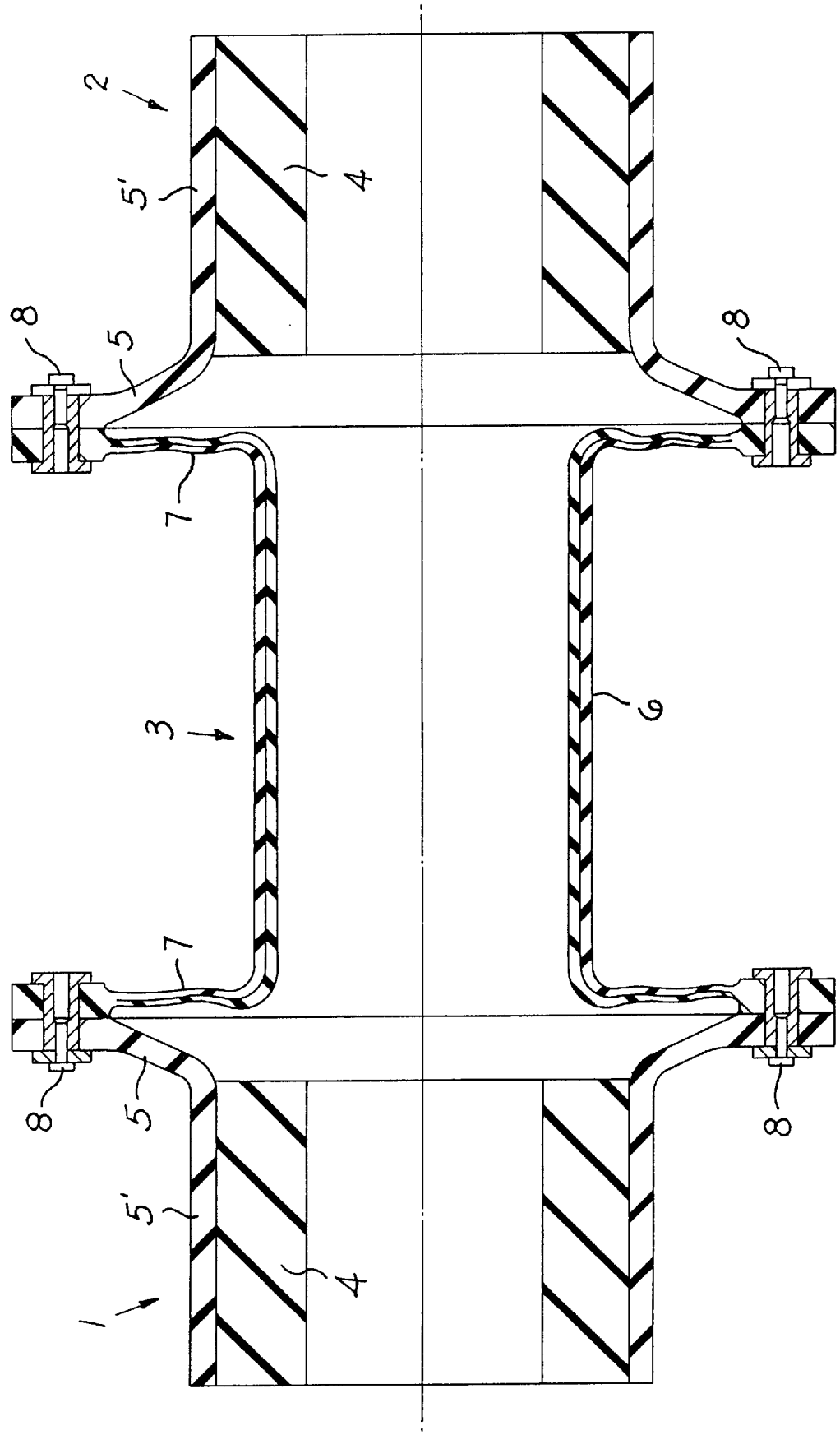

DRY COUPLING

FIELD OF THE INVENTION

The present invention relates to a dry coupling for interconnecting a driving shaft and a driven shaft, with two hub parts to be shrunk onto the shafts, each with a hub flange and an intermediate tube interconnecting same with two side flanges, each forming an elastically deformable membrane, which are connected to the hub flanges for the transmitting of torque.

BACKGROUND ART

Couplings of the kind mentioned above are known especially in high speed machines. They serve, thereby, for the transmitting of the torque and of possible additional forces from a steel shaft by means of a known pressurised-oil connection onto a steel hub and from this steel hub via shrunk on plastic hubs and so called membranes of an intermediate tube (torsion tube). In these known designs parts of steel and such of plastic material are used.

BRIEF DESCRIPTION OF THE INVENTION

Object of the present invention is the provision of a dry coupling which improves the vibration-technical behaviour of the machines coupled together with a basically same technical design without giving rise to additional expenditures.

This object is met by a dry coupling of the kind defined above in accordance with the invention in that all important structural parts of the coupling, namely at least the hub parts with the hub flanges belonging thereto and the intermediate tube consist of a plastic material.

Specifically preferred embodiments of the dry coupling in accordance with the invention are defined in the claims.

Such a preferred embodiment consists in that the hub parts and their flanges consist of a high modulus fibre reinforced material (FVW), specifically of a carbon fibre reinforced material (CFK), whereas the intermediate tube with its integrated side flanges is formed of a low modulus plastic material, specifically of a glass fibre reinforced plastic (GFK).

Surprisingly it has been noted that a coupling structured in accordance with the invention has a lower weight and costs less in comparison with the known designs of steel and plastic and significally improves due to the reduced weight the vibration-technical behaviour of the machine which includes the coupling.

BRIEF DESCRIPTION OF THE DRAWING

The invention will be explained hereinbelow somewhat more in detail based on an example illustrated in the the single figure of the drawing in which a coupling provided by the invention is shown in side view, in section.

THE PREFERRED EMBODIMENT

The single figure illustrates a coupling in accordance with the invention for a interconnecting of two shafts (not illustrated), namely a driving shaft and a driven shaft. The hub 1 is shrunk or pressed, resp. onto the shaft at the driving side (by methods known at such couplings), whereas the hub 2 is to be shrunk or pressed, resp., onto the shaft at the driven side. The known shrinking-on proceeds e.g. with a pressurised-oil connection which allows the user the assemble the coupling with the same tools which are used for steel couplings (e.g. tooth couplings, steel membrane couplings).

At the illustrated embodiment the hubs 1 and 2 are of an identical design. Each hub 1,2 consists of a hub part 4 proper and two hub flanges 5, which are bonded via a cylinder shaped tube stub 5' by means of a shrunk adhesive method onto the hub parts 4. The hub parts 4 and also the hub flanges 5,5', as well, consist of a high modulus FVW, specifically of CFK and feature therewith a high rigidity.

A torsion tube 3, the so called intermediate tube, is arranged between the two hubs 1,2, consisting of a cylinder shaped tube section 6 with side flanges 7 arranged at both its sides. Also the two side flanges 7 forming an easily deformable membrane are designed in the same way. The side flanges 7 are designed undulatory (e.g. according to AT-A 395 901 of the Geilinger company) and consist of plastic material, too. As illustrated, the side flanges 7 are integrated into the tube section 6 (integral) and consist as a rule of the same material (GFK) as the tube section 6. It is also possible to use for the outer flange part a high modulus plastic material with a carbon fibre reinforcement (CFK) (more intrinsic production). In the connection zone of the side flanges 7 with the adjoining hub flanges 5 the fibre reinforcement can be oriented in the circumferential direction (increased capability of absorbing centrifugal forces).

The connection of the side flanges 7 of the intermediate tube 3 to the corresponding hub flanges for the transmitting of torques proceeds at the illustrated example by means of a plurality of metal screws 8 (the only metal parts).

The connection could be made e.g. also by an outer threaded sleeve at flange surfaces pressed against each other or by means of a known tooth coupling.

It has been proven that specifically the combination of a low modulus and high modulus fibre reinforced plastic material for the parts of the coupling is in a position to optimally absorb centrifugal forces and also displacements, as well, whereby by this use of FVW for all parts of the coupling an optimal behaviour regarding stiffness and rigidity is obtained at a small mass.

What is claimed is:

1. The dry coupling system for interconnecting a driving shaft to a driven shaft for providing light weight and low propensity to vibrate constructed substantially of light weight metal free plastic materials capable of bearing a coupling torque between the two shafts, comprising in combination:

two hubs of a high modulus fibre reinforced plastic material of high rigidity fitted onto respective driving and driven shafts, a hub flange of a high modulus carbon fibre reinforced plastic material of high rigidity bonded onto each of the hubs comprising a stub portion bonded to the respective hubs and an extending elastically deformable flange portion, an intermediate hollow flanged torque transmitting tubular member consisting of a low modulus fibre reinforced material integrally formed as one piece with flanges extending therefrom at opposing ends for mating with the respective flange portions of the two hub flanges whereby the fibre reinforced plastic material bears the coupling torque between the two shafts, and fastening means mating the flanges of said tubular member to the flange portions of the two hub flanges in torque transmitting coupling joints.

2. The dry coupling system according to claim 1 characterized in that the fiber reinforcement material of the side flanges of the intermediate tubular member is oriented in the direction of the circumference at least in the zones of connection to the hub flanges.

3. The dry coupling system according to claim 1 characterized in that the fastening means between the hub flanges and the flanges of the intermediate tubular member comprises threaded bolts.

4. The dry coupling system of claim 1 further comprising cylindrical shaped and cylindrical shaped hub flanges.

5. The dry coupling system of claim 1 wherein said low modulus fibre reinforced material further comprises a glass fibre reinforced material.

6. Dry coupling system according to claim 1, characterized in that the hubs with the corresponding hub flanges and the intermediate tubular member consist of a high modulus fibre material, specifically a carbon fibre material.

7. The dry coupling system of claim 1 wherein said high modulus fibre reinforced material further comprises a carbon fibre reinforced material.

* * * * *